(12) United States Patent
Shen (10) Patent No.: US 11,198,603 B1
(45) Date of Patent: Dec. 14, 2021

(54) PUSH TYPE ANTI-SCALDING WATER DISPENSER

(71) Applicant: SUZHOU OASIS ELECTRONIC CO., LTD., Jiangsu (CN)

(72) Inventor: Yu-Chun Shen, Jiangsu (CN)

(73) Assignee: SUZHOU OASIS ELECTRONIC CO., LTD., Jiangsu (CN)

( * ) Notice: Subject to any disclaimer, the term of this patent is extended or adjusted under 35 U.S.C. 154(b) by 0 days.

(21) Appl. No.: 16/987,656

(22) Filed: Aug. 7, 2020

(51) Int. Cl.
*B67D 1/14* (2006.01)
*B67D 1/00* (2006.01)
*B67D 1/08* (2006.01)

(52) U.S. Cl.
CPC ......... *B67D 1/1477* (2013.01); *B67D 1/0003* (2013.01); *B67D 1/0887* (2013.01); *B67D 1/1466* (2013.01)

(58) Field of Classification Search
CPC .. B67D 1/1477; B67D 1/0003; B67D 1/0887; B67D 1/1466; B67D 1/145
See application file for complete search history.

(56) References Cited

U.S. PATENT DOCUMENTS

| | | | | |
|---|---|---|---|---|
| 2001/0032954 | A1* | 10/2001 | Kawolics | F16K 41/103 251/262 |
| 2010/0258203 | A1* | 10/2010 | Meyer | F16K 35/025 137/377 |
| 2016/0009542 | A1* | 1/2016 | Meyer | B67D 1/1438 222/505 |

* cited by examiner

*Primary Examiner* — Donnell A Long
(74) *Attorney, Agent, or Firm* — Juan Carlos A. Marquez; Marquez IP Law Office, PLLC (57) ABSTRACT

The present invention discloses a push-type anti-scalding water dispenser faucet having: a faucet main body; a valve core assembly controlling a water output; a press board mechanism driving the valve core assembly to move; a retaining structure allowing the press board mechanism to switch between a locking position and a release position. The water dispenser faucet comprises a disposable finger stall for mounting onto the press board mechanism or a finger of a user.

9 Claims, 8 Drawing Sheets

PUSH TYPE ANTI-SCALDING WATER DISPENSER

BACKGROUND OF THE INVENTION

1. Technical Field

The present invention relates to the field of water dispenser faucet, and in particular, to a push-type anti-scalding water dispenser faucet.

2. Description of Related Art

Presently, hot water faucets equipped with an anti-scalding mechanism available in the market typically adopts the basic structure of dividing the water release press board of the faucet into two parts of a fixed press board and a movable press board. During the use of the faucet, it is necessary to use fingers to hold the fixed pressing board and to use the thumb to push the movable press board toward the direction of the fixed press board simultaneously in order to allow the movable press board to engage with the fixed press board, following which the water release board needs to be rotated downward in order to allow the faucet to dispense hot water. Such structure is found to have at least three drawbacks. The first drawback refers to its relatively high operational difficulty, and it is particularly hard to operate for users not familiar with such finger type of operation. The second drawback refers to its hazard of hand scalding by hot water steam as the entire hand of the user is on top of the faucet throughout the operating process. The third drawback is associated with its deficiency in the epidemic prevention measures such that there is a likelihood of virus contamination during the pandemic nowadays.

BRIEF SUMMARY OF THE INVENTION

The main technical problem to be overcome by the present invention is to provide a push-type anti-scalding water dispenser faucet having a simple structure and facilitate operation.

To overcome the aforementioned technical problem, a technical solution adopted by the present invention refers to: providing a push-type anti-scalding water dispenser faucet comprising a faucet main body, a valve core assembly, a faucet cap, a press board mechanism and a retaining structure.

the faucet main body comprising an internal cavity, a water inlet, a water outlet and a faucet cap installation opening;

the valve core assembly installed at the internal cavity of the faucet main body and configured to control a water output;

the press board mechanism connected to the valve core assembly and configured to drive the valve core assembly to move;

the faucet cap installed at the faucet cap installation opening of the faucet main body;

the retaining structure installed at a top portion of the faucet cap and configured to cooperate with the press board mechanism, thereby allowing the press board mechanism to switch between a locking position and a release position; and wherein when the press board mechanism is at the locking position, upward and downward rotations of the press board mechanism are limited; when the press board mechanism is at the release position, the upward and downward rotations of the press board mechanism are released;

the retaining structure and the faucet cap are integrally formed as one piece.

The technical effects of the present invention include: The push-type anti-scalding water dispenser faucet of the present invention adopts a push-type operating mechanism with facilitated and convenient operation such that it can be operated by one single finger in order to prevent scalding hazard when the entire hand of a user is placed on top of the faucet as well as to facilitate the epidemic prevention measures to be adopted easily at a later stage. Furthermore, the retaining structure is arranged on the top portion of the faucet and is configured to have an integral structure; therefore, the overall structure is simplified and the cost is reduced.

DETAILED DESCRIPTION OF THE INVENTION

Figure 1:
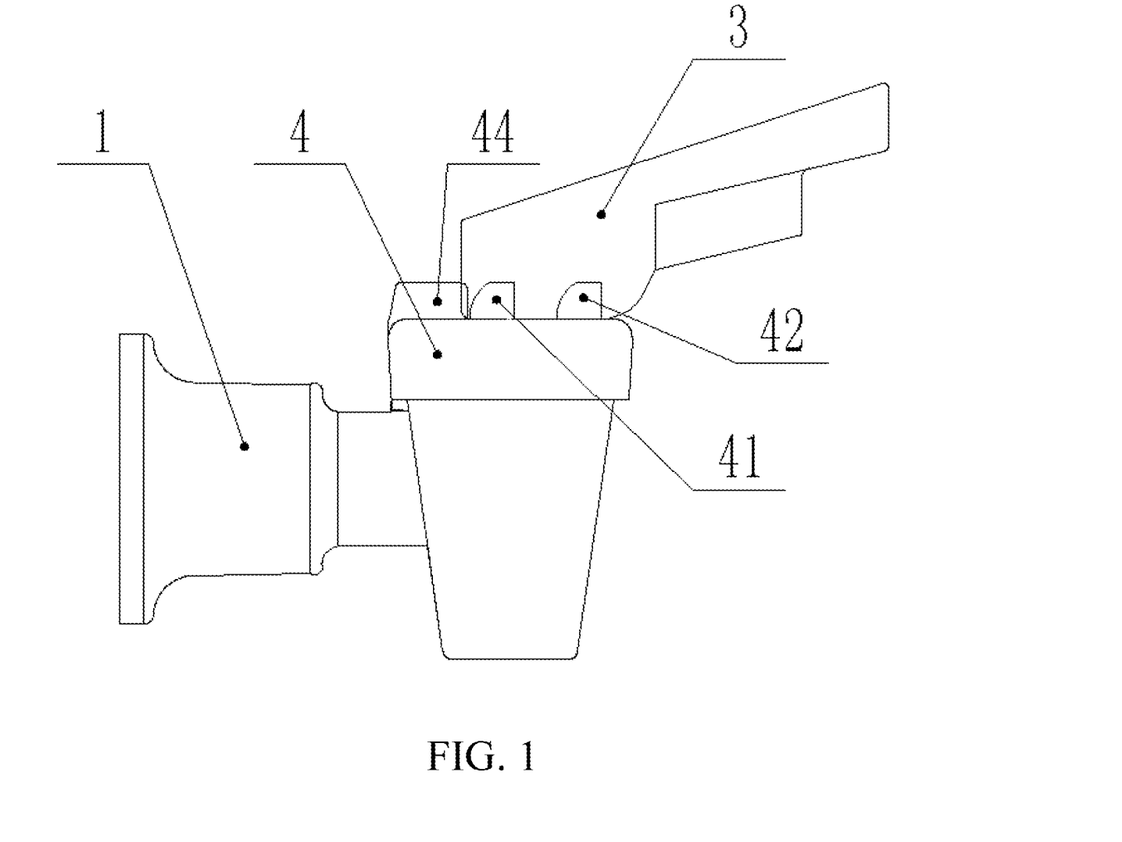
FIG. 1 is a structural view showing a preferred embodiment of the push-type anti-scalding water dispenser faucet of the present invention with the press board mechanism at the locking position.
Figure 2:
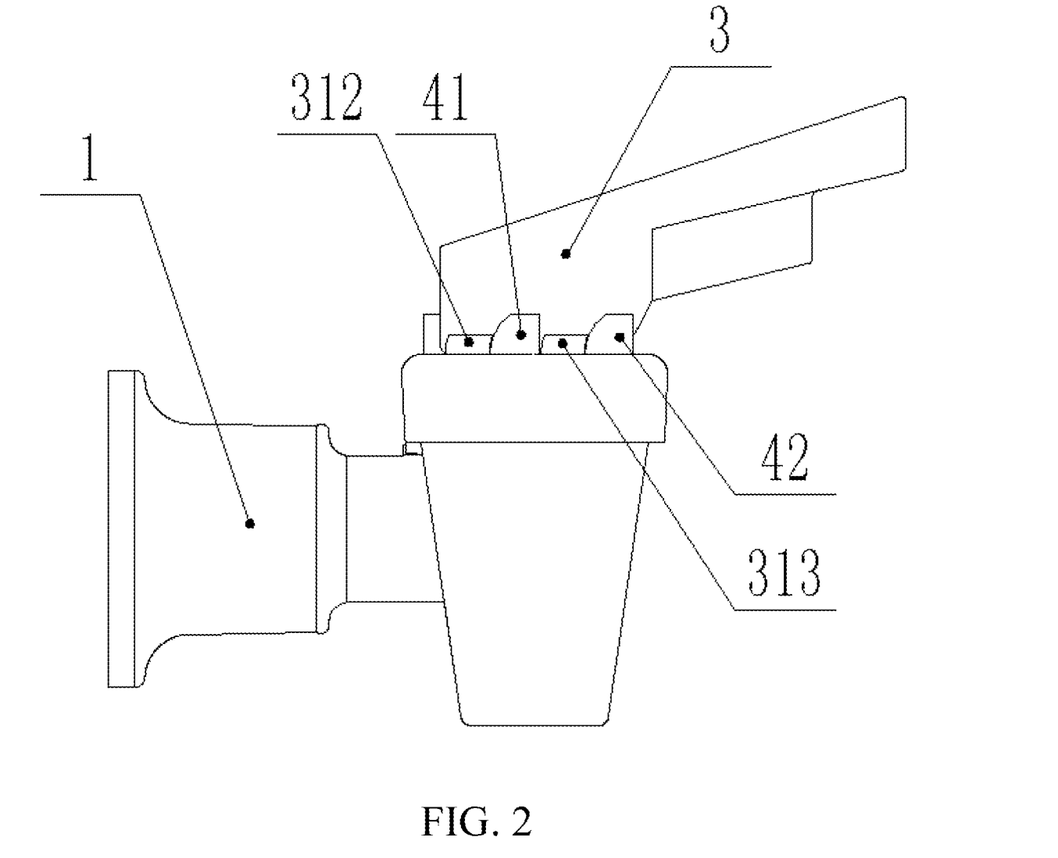
FIG. 2 is a structural view showing the push-type anti-scalding water dispenser faucet of FIG. 1 with the press board mechanism at the release position.

Please refer to FIG. 1 and FIG. 2, embodiments of the presentation comprise:

A push-type anti-scalding water dispenser faucet, comprising: a faucet main body 1, a valve core assembly (not labeled in the drawing), a press board mechanism 3 and a retaining structure (faucet cap 4). The valve core assembly 2 is installed at the internal of the faucet main body 1. The press board mechanism 3 is connected to the valve core assembly in order to drive the valve core assembly to move. The retaining structure is arranged on the faucet main body 1 and cooperates with the press board mechanism 3 in order to allow the press board mechanism 3 to switch between a locking position and a release position. As shown in FIG. 1, when the press board mechanism 3 is at the locking position, the upward and downward rotations of the press board mechanism 3 are limited. As shown in FIG. 2, when the press board mechanism 3 is at the release position, the upward and downward rotations of the press board mechanism 3 are released.

Figure 3:
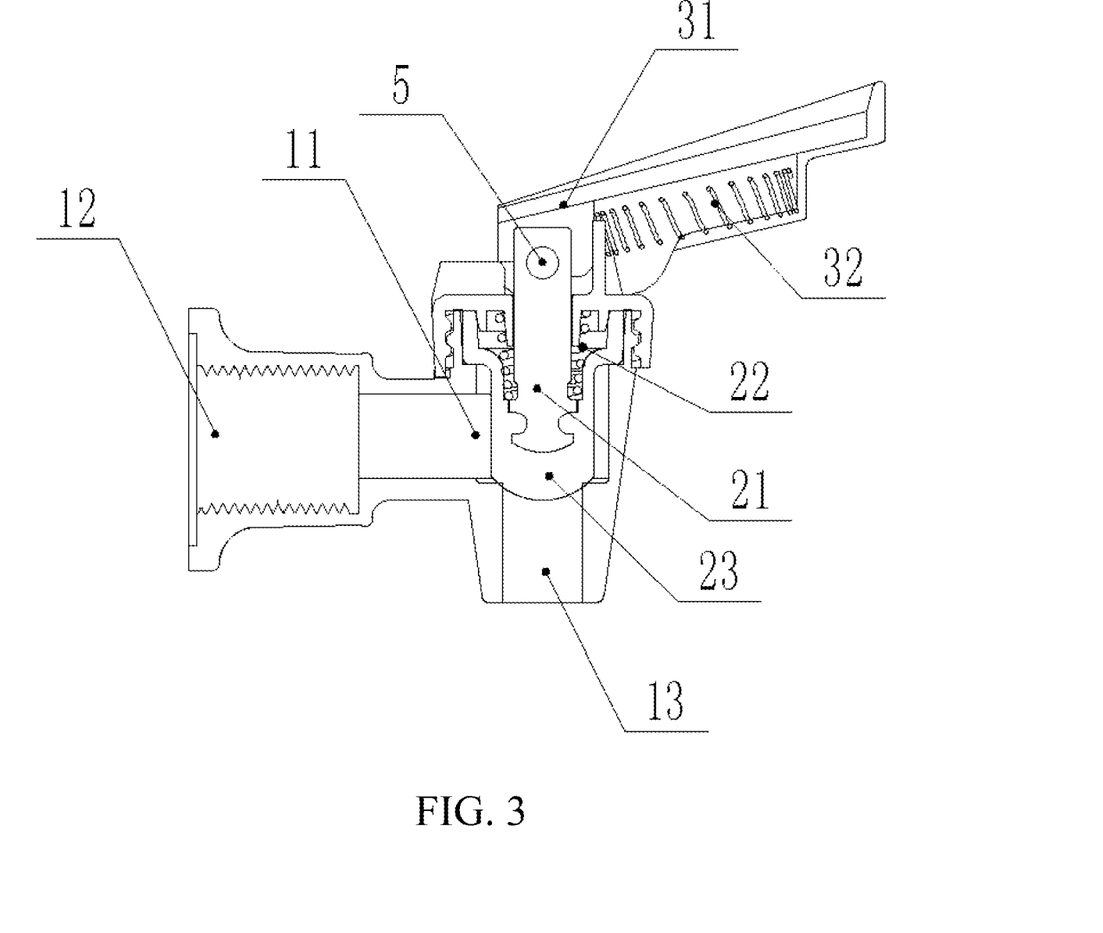
FIG. 3 is an internal structural view of the push-type anti-scalding water dispenser faucet of FIG. 1 under the close state.
Figure 4:
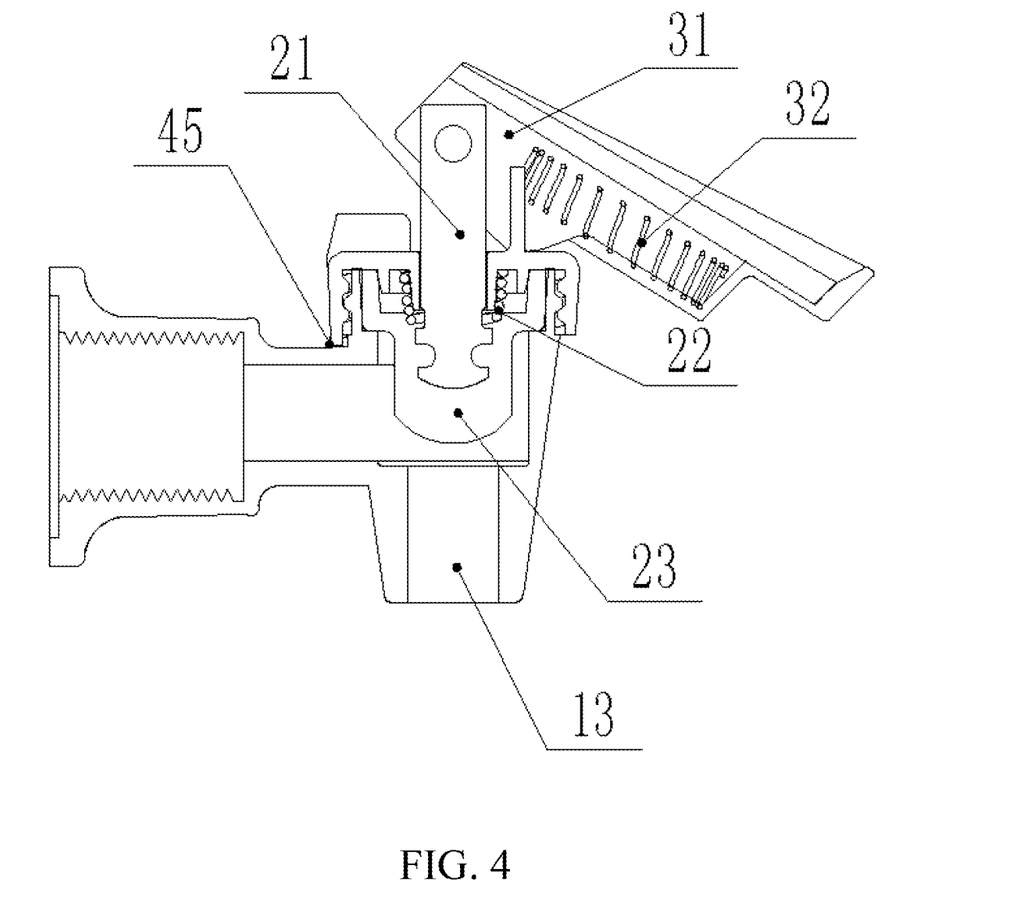
FIG. 4 is an internal structural view of the push-type anti-scalding water dispenser faucet of FIG. 1 under the open state.

Please refer to FIG. 3 and FIG. 4 together. The faucet main body 1 comprises an internal cavity 11, a water inlet 12 and a water outlet 13. The valve core assembly comprises a valve core 21, a sealing spring 22 and a sealing silicone cover 23. The valve core assembly is installed at the internal cavity of the faucet main body 1 and is configured to control the water output. To be more specific, the sealing silicone cover 23 is a main body of the valve core assembly. The top portion of the valve core 21 is connected to the press board mechanism 3, the bottom portion of the valve core 21 is inserted into the bottom portion of the sealing silicone cover 23, and the sealing spring 22 is mounted onto the valve core 21. Normally, when the bottom portion of the sealing silicone cover 23 is under the pressure of the sealing spring 22, it abuts against the water outlet of the faucet firmly to prevent water leakage. When the pin on the valve core 21 is under the effect of the press board mechanism 3, it is able to overcome the resistance of the sealing spring 22 in order to drive the valve core 21 to move upward, thereby further driving the sealing silicone cover 23 to separate from the water outlet 12 of the faucet main body 1, and water is able flow out from the water outlet 12.

As shown in this embodiment, the water dispenser faucet further comprises a faucet cap 4 and the retaining structure is mainly arranged at the top portion of the faucet cap 4 to cooperate with the press board mechanism 3 together. The faucet cap 4 is installed at the faucet cap installation opening of the faucet main body 1. The faucet cap 4 is connected to the faucet main body 1 via threads. The edge of the faucet cap 4 can include a latch 45 provided to prevent self-rotation of the faucet cap 4. In this embodiment, the top portion of the faucet cap 4 includes the retaining structure and further includes a reset spring blocking plate and a press board member guiding rib 44.

Figure 7:
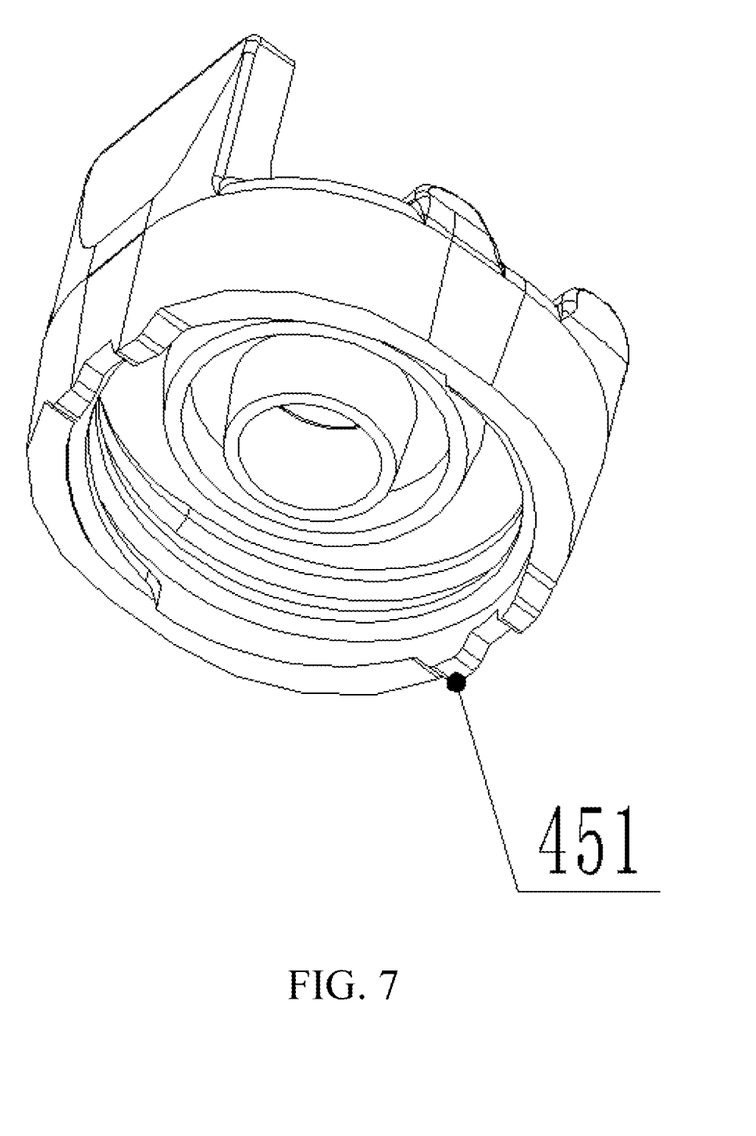
FIG. 7 is a structural view of the faucet main body.
Figure 8:
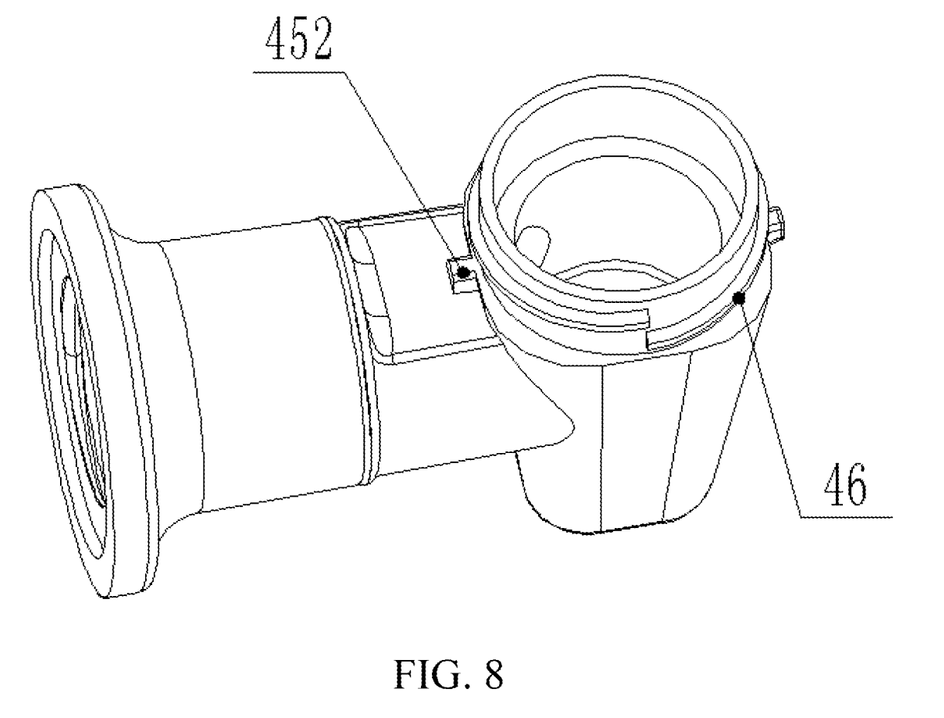
FIG. 8 is a structural view of the faucet cap.

As shown in FIG. 7 and FIG. 8, the latch 45 comprises a locking slot structure 451 arranged on the faucet cap 4 and a protrusion structure 452 arranged on the faucet main body 1. When the faucet cap 4 is rotated to the locking position, the protrusion structure 452 is locked into the locking slot structure 451 to complete the locking. As shown in this embodiment, the faucet cap 4 includes two locking slot structures 451, and the faucet cap can be locked at the desired position, thereby allowing the press board mechanism 3 to be secured at the desired position and to perform forward and backward movements in the desired direction. In addition, the threaded structure cooperating with the faucet cap 4 and the faucet main body 1 is a 90-degree rotational threaded structure 46. Since the aforementioned 90-degree rotational installation method is adopted, the press board mechanism 3 and the faucet cap 4 can be selected for the two directions of either the front pressing or rear pressing such that it can be used for different purposes.

Figure 5:
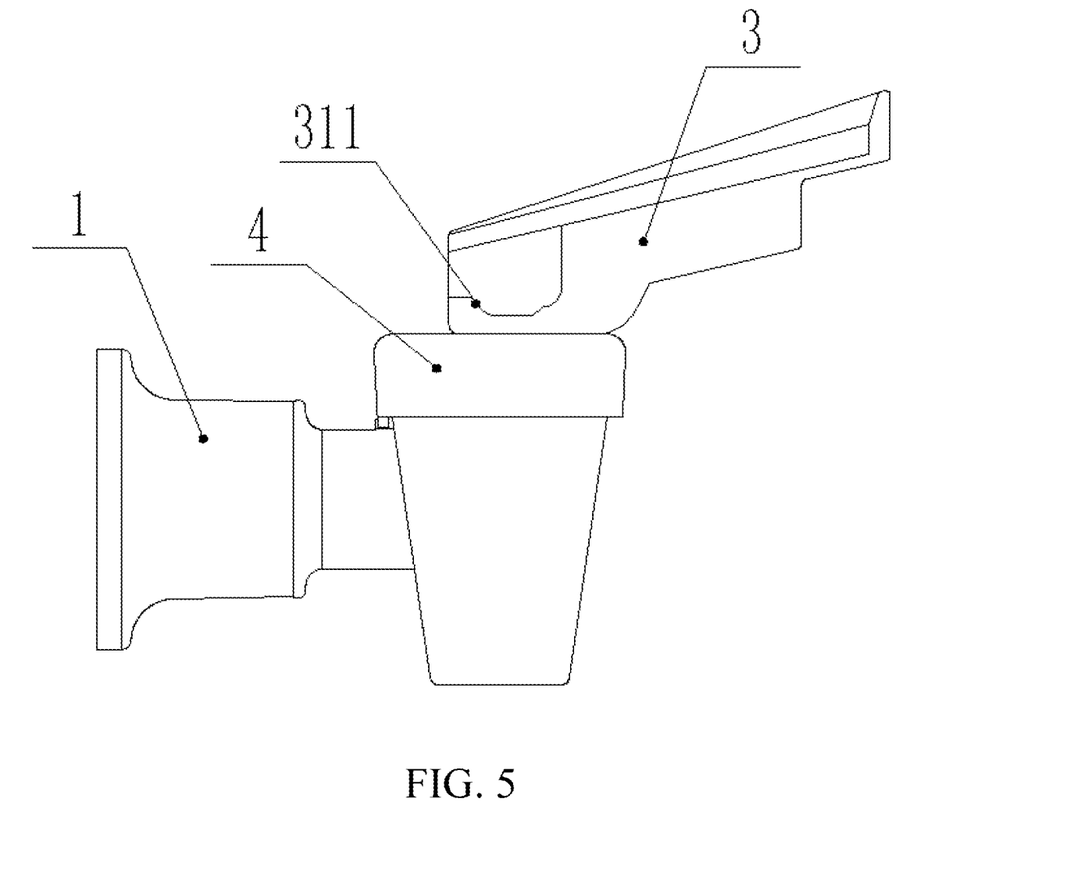
FIG. 5 is a structural view of the pin elevating stage of the push-type anti-scalding water dispenser faucet of FIG. 1.
Figure 6:
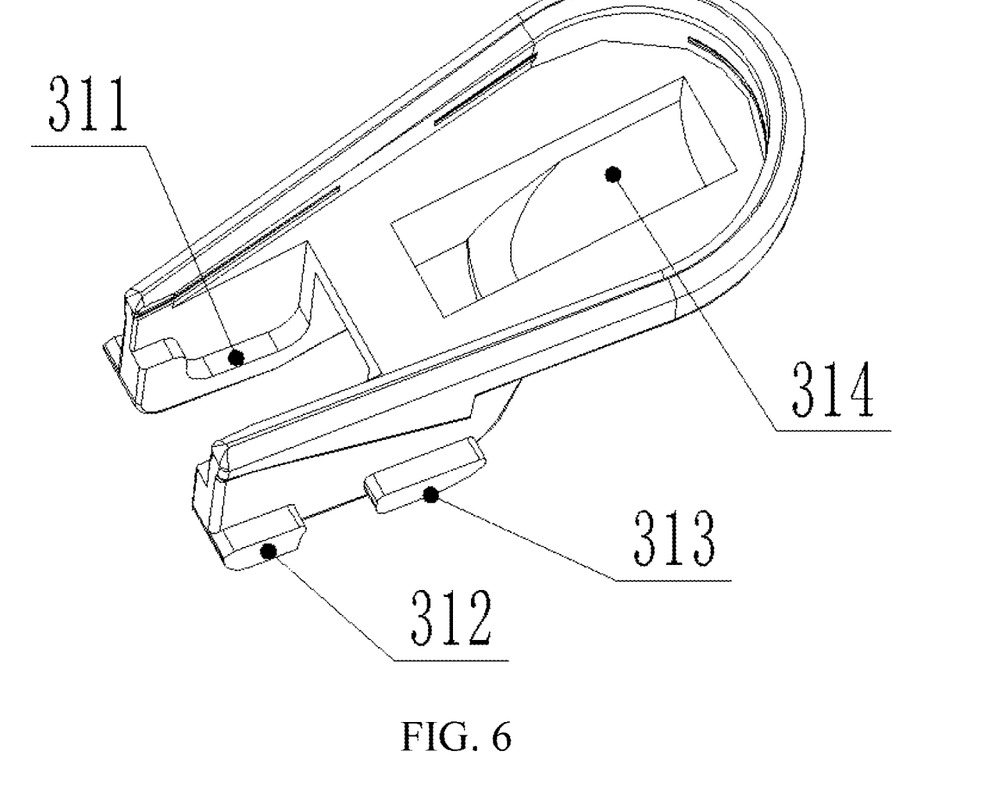
FIG. 6 is a structural view of the press board member.

The press board mechanism 3 comprises a press board member 31 and a return spring 32, and the return spring 32 is installed inside the spring slot 314 of the press board member 31. The rear end of the return spring 32 abuts against the return spring blocking plate on the faucet cap 4. When the press board mechanism 3 is at the release position, the return spring 32 is compressed, i.e. when the user uses his or her finger to push the press board member 31 forward, the return spring 32 is compressed. When the user removes his or her finger away from the press board member 31, the press board member 31 returns back to its original position under the reaction force of the spring 32. The valve core 21 is connected to the press board member 31 via the pin 5. To be more specific, the top portion of the valve core 21 includes a horizontal hole provided for the installation of the pin 5. As shown in FIG. 5 and FIG. 6 together, the inner side of the bottom portion of the press board member 31 includes a pin elevating stage 311. The two ends of the pin 5 are pressed onto the pin elevating stage 311, such that when the press board member 311 is pressed downward, the pin elevating stage 311 is lifted upward, thereby driving the pin 5 and the valve core 21 to move upward together. In addition, the elevating stage 311 comprises a horizontal section capable of ensuring that when the press board member 31 moves forward or backward, the pin 5 is able to roll on the horizontal section without driving the valve core 21 to move together.

As shown in FIG. 1 and FIG. 2 together, the top portion of the faucet cap 4 includes a through hole and a retaining piece. The retaining piece includes a retaining slot formed thereon, and the bottom portion of the press board member 31 further includes a retaining rib configured to cooperate with the retaining slot. When the retaining rib is located inside the retaining slot, the press board mechanism 3 is at the locking position. When the press board mechanism 3 moves forward, causing causes the retaining rib to disengage from the retaining slot, the press board mechanism 3 is at the release position. To ensure the upward and downward rotations of the press board member 31, the front side surface of the retaining piece has a curved surface, and the rear side surface of the retaining rib has a corresponding curved surface. As shown in this embodiment, the top portion of the faucet cap 4 includes two retaining pieces of a front retaining piece 41 and a rear retaining piece 42 having a front retaining slot and a rear retaining slot formed thereon respectively, and the corresponding bottom portion of the press board member 31 includes a front retaining rib 312 and a rear retaining rib 313 arranged thereon correspondingly. The through hole of the faucet cap 4 includes a core valve sleeve 43. The valve core sleeve 21 penetrating through the valve core sleeve 43 and the through hole to connect to the press board member 31. The top portion of the faucet cap 4 includes a press board guiding rib 44 configured to provide guidance during forward and backward movements of the press board member 31, thereby preventing any tilting of the press board member 31 during its forward movement.

Figure 9:
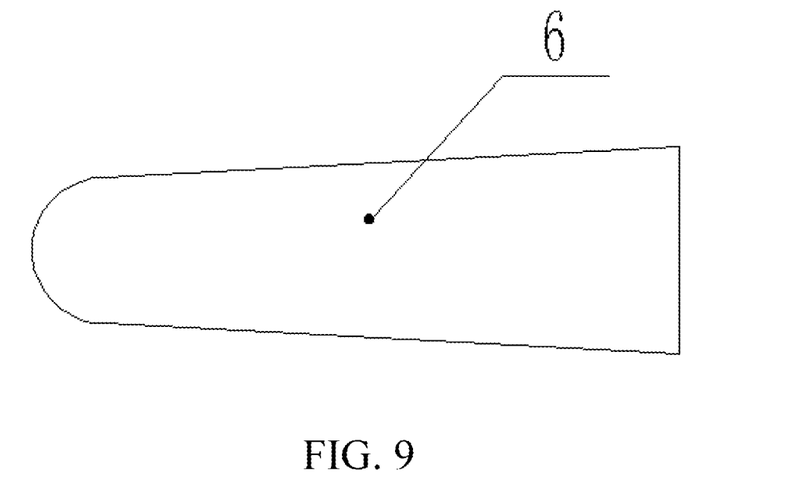
FIG. 9 is a structural view of the finger stall.

As shown in FIG. 9, the water dispenser faucet can be further equipped with a disposable finger stall 6. The disposable finger stall 6 can be a medical grade plastic medicine finger stall, and it can be directly mounted onto the press board member 31 for use, or it can be worn on a finger for use. A finger stall can be replaced for each user releasing water from the water dispenser faucet in order to prevent person-to-person virus infection.

The operation process of the push-type anti-scalding water dispenser faucet of the present invention is as follows: On the press board member 31 or after the user wears the disposable finger stall 6 on his or her finger, the user uses his or her finger to push the press board member 31 to move forward in order to reach the release position. Next, the user uses his or her finger to press the rear end of the press board member 31 downward, and the front end of the press board member 31 drives the valve core 21 upward, following which the water then flows out from the water outlet 12. To close the faucet, the user can simply remove his or her finger, and the valve core 21 returns back to its original position under the reaction of the sealing spring 22 in order to close the water outlet 12, thereby further driving the front end of the press board 31 to return to its position downward, and the return spring 32 also drives the press board member 31 to return to its position rearward such that the press board member 31 reaches the locking position.

The push-type anti-scalding water dispenser faucet of the present invention provides the design of a push-type operation mechanism that is of facilitated and convenient operation to overcome the drawback of relatively high difficulty of operation, particularly inconvenient to users not familiar with finger type of operation, associated with the currently existing anti-scalding faucets: For the drawback of the scalding hazard of currently existing anti-scalding faucets that hand scalding may occur due to the entire hand of the user being placed on top of the faucet during the operation, the present invention provides the design of a mechanism that can be operated by one single finger in order to prevent the entire hand from being placed on top of the faucet during the operation. For the drawback of lack of epidemic prevention measures for currently existing anti-scalding faucets, the present invention provides the design utilizing the solution of a disposable finger tall such that it is able to prevent person-to-person virus infection at the greatest extend. For the issue related to the complicated component parts of currently existing anti-scalding faucets, the present invention arranges various types of retaining structures at the top portion of the faucet cap and also adopts an integrally formed structure in order to simplify the production of component parts and the installation issue. In addition, the structure of the press board and the valve core with the use the pin or modified pin via fixed connection is changed to a non-fixed connecting structure capable of allowing the pin to be pressed onto the pin elevating stage for sliding cooperation, such that the press board member is not interfered by the valve core during its forward and backward movements. Accordingly, the press board member can also be further simplified into an integral structure, thereby achieving the forward and rearward movements as well as the upward and downward rotations.

What is claimed is:

1. A push-type anti-scalding water dispenser faucet, comprising:
   a faucet main body, a valve core assembly, a faucet cap, a press board mechanism and a retaining structure;
   the faucet main body comprising an internal cavity, a water inlet, a water outlet and a faucet cap installation opening;
   the valve core assembly installed at the internal cavity of the faucet main body and configured to control a water output;
   the press board mechanism connected to the valve core assembly and configured to drive the valve core assembly to move;
   the faucet cap installed at the faucet cap installation opening of the faucet main body;
   the retaining structure installed at a top portion of the faucet cap and configured to cooperate with the press board mechanism, thereby allowing the press board mechanism to switch between a locking position and a release position; and
   wherein when the press board mechanism is at the locking position, upward and downward rotations of the press board mechanism are limited; when the press board mechanism is at the release position, the upward and downward rotations of the press board mechanism are released; the retaining structure and the faucet cap are integrally formed as one piece;
   wherein the water dispenser faucet further comprises a disposable finger stall for mounting onto the press board mechanism or a finger of a user.

2. The push-type anti-scalding water dispenser faucet according to claim 1, wherein the valve core assembly comprises a valve core, a sealing spring and a sealing silicone cover; a top portion of the valve core is connected to the press board mechanism, and a bottom portion of the valve core is inserted into the sealing silicone cover; the sealing spring is mounted onto the valve core.

3. The push-type anti-scalding water dispenser faucet according to claim 1, wherein the press board mechanism comprises a press board member and a return spring; the return spring is installed inside a spring slot of the press board member, such that when the press board mechanism is at the release position, the return spring is compressed.

4. The push-type anti-scalding water dispenser faucet according to claim 3, wherein the top portion of the faucet cap includes a through hole provided to allow a top portion of the valve core to extend outward and the retaining structure; the retaining structure comprises a retaining piece; the retaining piece includes a retaining slot formed thereon, and a bottom portion of the press board member includes a retaining rib arranged corresponding to the retaining slot; when the retaining rib is located inside the training slot, the press board mechanism is at the locking position, and when the press board mechanism moves forward such that the retaining rib disengages from the retaining slot, the press board mechanism is at the release position.

5. The push-type anti-scalding water dispenser faucet according to claim 4, wherein the top portion of the faucet cap includes two retaining pieces of a front retaining piece and a rear retaining piece having a front retaining slot and a rear retaining slot formed thereon respectively; the corresponding bottom portion of the press board mechanism includes a front retaining rib and a rear retaining rib arranged thereon correspondingly.

6. The push-type anti-scalding water dispenser faucet according to claim 4, wherein the through hole of the faucet cap includes a valve core sleeve; the valve core penetrates through the sleeve and the through hole to connect to the press board member.

7. The push-type anti-scalding water dispenser faucet according to claim 4, wherein an edge of the faucet cap includes a latch; the latch comprises a locking slot structure and a protrusion structure, such that when the faucet cap is rotated to the locking position, the protrusion structure is locked into the locking slot structure to complete locking.

8. The push-type anti-scalding water dispenser faucet according to claim 7, wherein the valve core is connected to the press board member via a pin; an inner side of the bottom portion of the press board member includes a pin elevating stage; the pin elevating stage comprises a horizontal section; two ends of the pin are pressed onto the pin elevating stage.

9. The push-type anti-scalding water dispenser faucet according to claim 4, wherein the top portion of the faucet cap includes a press board member guiding rib configured to provide guidance during forward and backward movements of the press board member.

* * * * *